United States Patent
Yang

(10) Patent No.: US 12,100,400 B2
(45) Date of Patent: Sep. 24, 2024

(54) METHOD FOR CONTROLLING WEARABLE DEVICE, WEARABLE DEVICE, AND STORAGE MEDIUM

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 286 days.

(21) Appl. No.: 17/528,889

(22) Filed: Nov. 17, 2021

(65) Prior Publication Data
US 2022/0076684 A1 Mar. 10, 2022

Related U.S. Application Data

(63) Continuation of application No. PCT/CN2020/090980, filed on May 19, 2020.

(30) Foreign Application Priority Data

Jun. 10, 2019 (CN) .......................... 201910496570.7

(51) Int. Cl.
*G06F 17/00* (2019.01)
*G06F 1/16* (2006.01)
(Continued)

(52) U.S. Cl.
CPC .............. *G10L 17/22* (2013.01); *G06F 1/163* (2013.01); *G10L 17/06* (2013.01);
(Continued)

(58) Field of Classification Search
CPC ..... G10L 17/22; G10L 17/06; G10L 21/0232; G10L 2021/02082; G06F 1/163;
(Continued)

(56) References Cited

U.S. PATENT DOCUMENTS

2014/0270259 A1   9/2014  Goertz et al.
2014/0378083 A1  12/2014  Kannappan et al.
(Continued)

FOREIGN PATENT DOCUMENTS

CN   104657650 A   5/2015
CN   104850222 A   8/2015
(Continued)

OTHER PUBLICATIONS

International Search Report with English Translation for PCT/CN2020/090980 mailed Aug. 12, 2020.
(Continued)

*Primary Examiner* — Paul C McCord
(74) *Attorney, Agent, or Firm* — Young Basile Hanlon & MacFarlane, P.C.

(57) ABSTRACT

A method for controlling a wearable device includes: acquiring voice information collected by an acoustoelectric element and vibration information collected by a vibration sensor, in which the acoustoelectric element and the vibration sensor are included in the wearable device; determining a voice command based on the voice information; determining identity information of the voice command based on the voice information and the vibration information; and executing or ignoring the voice command based on the identity information.

19 Claims, 11 Drawing Sheets

(51) Int. Cl.
  *G10L 17/06* (2013.01)
  *G10L 17/22* (2013.01)
  *G10L 21/0232* (2013.01)
  *H04R 1/04* (2006.01)
  *H04R 1/40* (2006.01)
  *H04R 3/00* (2006.01)
  *G10L 21/0208* (2013.01)

(52) U.S. Cl.
  CPC ............ *G10L 21/0232* (2013.01); *H04R 1/04* (2013.01); *H04R 1/406* (2013.01); *H04R 3/005* (2013.01); *G10L 2021/02082* (2013.01); *H04R 2201/401* (2013.01)

(58) Field of Classification Search
  CPC .......... H04R 1/04; H04R 1/406; H04R 3/005; H04R 2201/401
  USPC ......................................................... 704/246
  See application file for complete search history.

(56) References Cited

U.S. PATENT DOCUMENTS

| | | | | |
|---|---|---|---|---|
| 2015/0161998 | A1* | 6/2015 | Park | G10L 15/24 704/231 |
| 2017/0303052 | A1* | 10/2017 | Kakareka | G01S 3/86 |
| 2018/0113673 | A1* | 4/2018 | Sheynblat | G10L 17/00 |
| 2019/0012445 | A1 | 1/2019 | Lesso et al. | |
| 2019/0012448 | A1 | 1/2019 | Lesso | |

FOREIGN PATENT DOCUMENTS

| | | |
|---|---|---|
| CN | 106468780 A | 3/2017 |
| CN | 108629167 A | 10/2018 |
| CN | 108735219 A | 11/2018 |
| CN | 108877813 A | 11/2018 |
| CN | 108986806 A | 12/2018 |
| CN | 109064720 A | 12/2018 |
| CN | 109119080 A | 1/2019 |
| JP | 2002091466 A | 3/2002 |
| JP | 2002358089 A | 12/2002 |
| JP | 2005084253 A | 3/2005 |
| JP | 2014018234 A | 2/2014 |
| JP | 2016516343 A | 6/2016 |
| JP | 2016127300 A | 7/2016 |
| JP | 2016540250 A | 12/2016 |
| JP | 2017032992 A | 2/2017 |
| JP | 2019502964 A | 1/2019 |
| WO | 2018061743 A1 | 4/2018 |

OTHER PUBLICATIONS

Indian Examination Report for IN Application 202117054712 mailed May 18, 2022. (7 pages).
Extended European Search Report for EP Application 20822293.5 mailed May 13, 2022. (10 pages).
Japanese Notice of Reasons for Refusal with English Translation for JP Application 2021571636 mailed Jan. 6, 2023. (14 pages).
Chinese First Office Action with English Translation for CN Application 201910496570.7 mailed Oct. 16, 2023. (21 pages).
India Office Action with English Translation for IN Application 202117054712 mailed Jun. 5, 2024. (3 pages).
European Office Action with English Translation for EP Application 20822293.5 mailed Apr. 9, 2024. (5 pages).

* cited by examiner

METHOD FOR CONTROLLING WEARABLE DEVICE, WEARABLE DEVICE, AND STORAGE MEDIUM

CROSS-REFERENCE TO RELATED APPLICATION(S)

This application is continuation of International Application No. PCT/CN2020/090980, filed on May 19, 2020, which claims priority to and benefits of Chinese Patent Application No. 201910496570.7, filed Jun. 10, 2019, the entire contents of both of which are incorporated herein by reference.

TECHNICAL FIELD

The disclosure relates to a field of electronic technologies, and particularly to a method for controlling a wearable device, a wearable device and a storage medium.

BACKGROUND

In the related art, the user may interact with the wearable device by voice.

SUMMARY

The disclosure provides a method for controlling a wearable device, a wearable device and a storage medium.

The embodiment of the disclosure provides a method for controlling a wearable device. The wearable device includes an acoustoelectric element and a vibration sensor. The method includes: acquiring voice information collected by the acoustoelectric element and vibration information collected by the vibration sensor; determining a voice command based on the voice information; determining identity information of the voice command based on the voice information and the vibration information; and executing or ignoring the voice command based on the identity information.

The wearable device in the embodiment of the disclosure includes a housing, a processor, an acoustoelectric element and a vibration sensor. The acoustoelectric element is arranged in the housing, and the processor is connected to the acoustoelectric element and the vibration sensor. The processor is configured to acquire voice information collected by the acoustoelectric element and vibration information collected by the vibration sensor; determine a voice command based on the voice information; determine identity information of the voice command based on the voice information and the vibration information; and execute or ignore the voice command based on the identity information.

A non-transitory computer readable storage medium has computer executable instructions, and when the computer executable instructions are executed by one or more processors, the processor is caused to execute a method for controlling a wearable device. The method includes: acquiring voice information collected by the acoustoelectric element and vibration information collected by the vibration sensor; determining a voice command based on the voice information; determining identity information of the voice command based on the voice information and the vibration information; and executing or ignoring the voice command based on the identity information.

BRIEF DESCRIPTION OF DRAWINGS

The above and/or additional aspects and advantages of the present disclosure may become apparent and easily understood in descriptions of embodiments in combination with drawings, in which.

DETAILED DESCRIPTION

Embodiments of the present disclosure are described in detail below, examples of which are illustrated in the accompanying drawings, in which the same or similar labels represent the same or similar elements or elements with the same or similar functions. The embodiments described below with reference to the drawings are explanatory, are intended to explain the present disclosure and are not to be construed as a limitation of the present disclosure.

Figure 1:
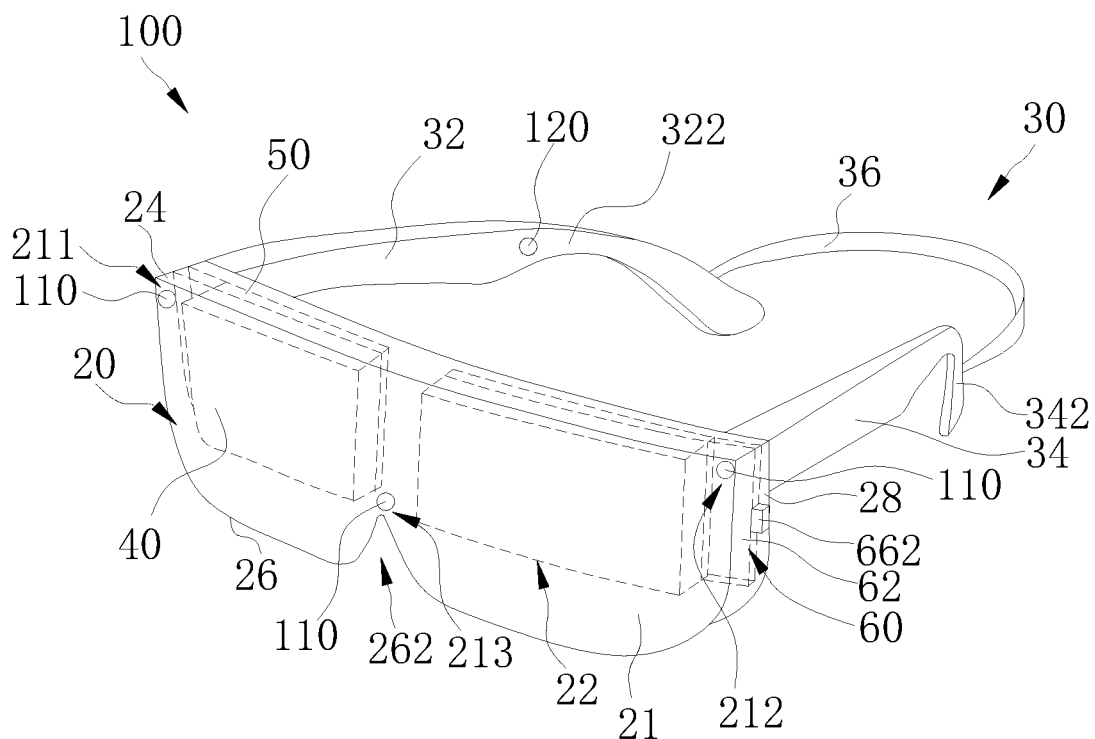
FIG. 1 is a perspective view of a wearable device in an embodiment of the disclosure.
Figure 2:
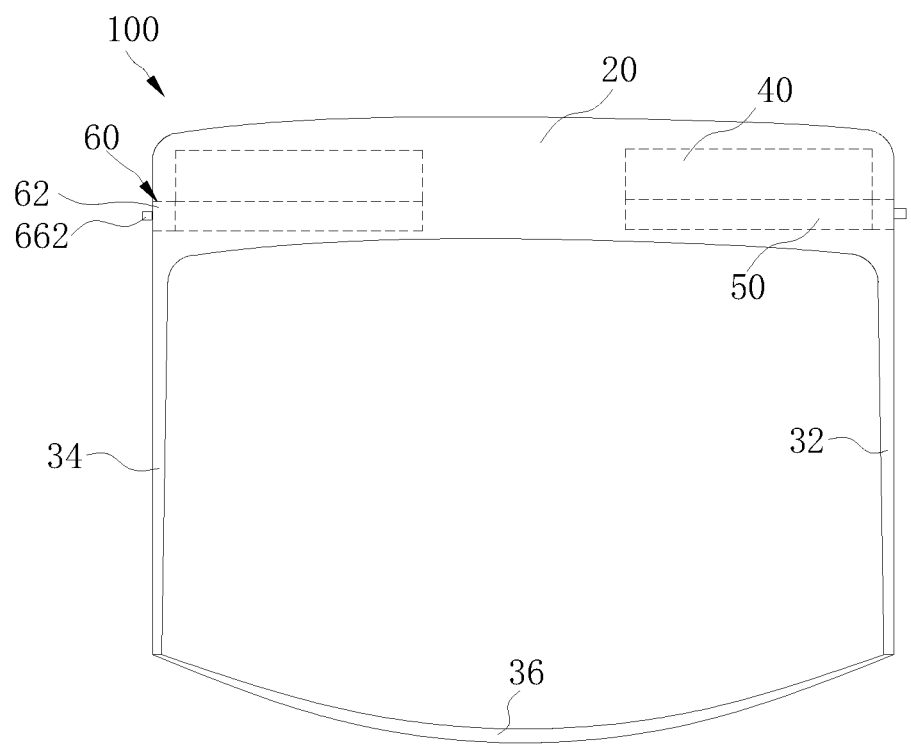
FIG. 2 is a plan view of a wearable device in another embodiment of the disclosure.

Referring to FIG. 1 and FIG. 2, the wearable device in the embodiment of the disclosure includes a housing 20, a supporting component 30, a display 40, a refractive component 50 and an adjustment mechanism 60.

The housing 20 is an external component of the wearable device 100, with functions of protecting and fixing internal components of the wearable device 100. The internal components are enclosed by the housing 20, which may avoid direct damage of external factors to the internal components.

Specifically, in the embodiment, the housing 20 may be configured to house and fix at least one of the display 40, the refractive component 50, and the adjustment mechanism 60. In the example of FIG. 2, the housing 20 is formed with a housing slot 22, and the display 40 and the refractive component 50 are received in the housing slot 22. The adjustment mechanism 60 is partially exposed from the housing 20.

The housing 20 further includes a housing front wall 21, a housing top wall 24, a housing bottom wall 26, and a housing side wall 28. A notch 262 is formed in the middle of the housing bottom wall 26 toward the housing top wall 24. Or, the housing 20 is substantially "B" shaped. When the user wears the wearable device 100, the wearable device 100 may be erected on the nose bridge of the user through the notch 262, so as to ensure the stability of the wearable device 100 and the wearing comfort of the user. The adjustment mechanism 60 may be partially exposed from the housing side wall 28 so that the user adjusts the refractive component 50.

In addition, the housing 20 may be formed by machining aluminum alloys through a computerized numerical control (CNC) machine tool, or may be injection molded by polycarbonate (PC) or PC and acrylonitrile butadiene styrene plastic (ABS). The specific manufacturing method and specific materials of the housing 20 are not limited here.

The supporting component 30 is configured to support the wearable device 100. When the user wears the wearable device 100, the wearable device 100 may be fixed to the user's head through the supporting component 30. In the example of FIG. 2, the supporting component 30 includes a first bracket 32, a second bracket 34, and an elastic band 36.

The first bracket 32 and the second bracket 34 are symmetrically disposed with respect to the notch 262. Specifically, the first bracket 32 and the second bracket 34 are rotatably disposed on an edge of the housing 20, and when the user does not need to use the wearable device 100, the first bracket 32 and the second bracket 34 may be folded close to the housing 20 to facilitate storage. When the user needs to use the wearable device 100, the first bracket 32 and the second bracket 34 may be unfolded to achieve supporting functions of the first bracket 32 and the second bracket 34.

An end of the first bracket 32 away from the housing 20 is formed with a first bending portion 322, and the first bending portion 322 is bent toward the housing bottom wall 26. In this way, when the user wears the wearable device 100, the first bending portion 322 may be erected on the cars of the user, so that the wearable device 100 is not easily slipped.

Similarly, an end of the second bracket 34 away from the housing 20 is formed with a second bending portion 342, and the second bending portion 342 is bent toward the housing bottom wall 26. The explanation and description of the second bending portion 342 may refer to the first bending portion 322, which will not be repeated here to avoid redundancy.

The elastic band 36 is detachably connected to the first bracket 32 and the second bracket 34. In this way, when the user performs vigorous activities with the wearable device 100, the wearable device 100 may be further fixed by the elastic band 36, so that the wearable device 100 is prevented from loosening or even falling in vigorous activities. It may be understood that, in other examples, the elastic band 36 may also be omitted.

In the embodiment, the display 40 includes an OLED display screen. The OLED display screen does not need a backlight, which facilitates thinning of the wearable device 100. Moreover, the OLED screen has a large visual angle, low in power consumption, which is beneficial to saving power consumption.

Of course, the display 40 may also be an LED display or a Micro LED display. These displays are merely as examples, which are not limited in embodiments of the present disclosure.

Figure 3:
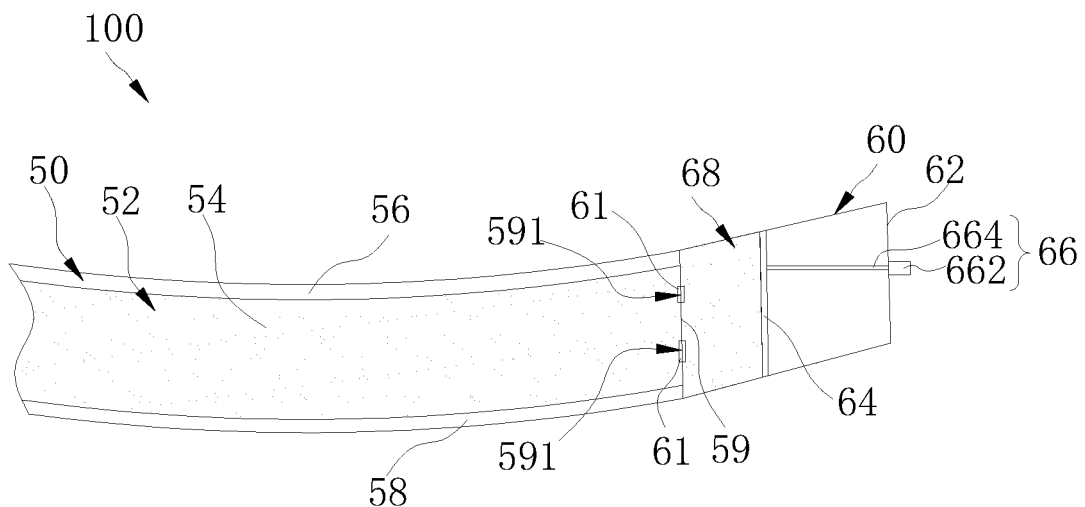
FIG. 3 is a plan view of a partial structure of a wearable device in an embodiment of the disclosure.

Referring to FIG. 3, the refractive component 50 is disposed on a side of the display 40. The refractive component 50 includes a refractive cavity 52, a light-transmitting liquid 54, a first film layer 56, a second film layer 58, and a side wall 59.

The light-transmitting liquid 54 is set in the refractive cavity 52. The adjustment mechanism 60 is configured to adjust an amount of light-transmitting liquid 54 to adjust a morphology (shape and state) of the refractive component 50. Specifically, the second film layer 58 is arranged relative to the first film layer 56, the side wall 59 is connected to both the first film layer 56 and the second film layer 58, the refractive cavity 52 is enclosed by the first film layer 56, the second film layer 58, and the side wall 59, and the adjustment mechanism 60 is configured to adjust the amount of light-transmitting liquid 54 to change a shape of the first film layer 56 and/or the second film layer 58.

In this way, the refractive function of the refractive component 50 is achieved. Specifically, there are three cases for "changing a shape of the first film layer 56 and/or the second film layer 58": in a first case, changing a shape of the first film layer 56 and not changing a shape of the second film layer 58; in a second case, not changing a shape of the first film layer 56 and changing a shape of the second film layer 58; in a third case, changing a shape of the first film layer 56 and changing a shape of the second film layer 58. It should be noted that, for convenience of explanation, the embodiment is illustrated by taking the first case as an example.

The first film layer 56 may be elastic. It may be understood that, as the amount of light-transmitting liquid 54 in the refractive cavity 52 changes, the pressure in the refractive cavity 52 changes accordingly, so that the morphology of the refractive component 50 changes.

In an example, the adjustment mechanism 60 reduces the amount of light-transmitting liquid 54 in the refractive cavity 52, the pressure in the refractive cavity 52 decreases, a pressure difference between the pressure outside the refractive cavity 52 and the pressure inside the refractive cavity 52 increases, and the refractive cavity 52 is more recessed.

In another example, the adjustment mechanism 60 increases the amount of light-transmitting liquid 54 in the refractive cavity 52, the pressure in the refractive cavity 52 increases, the pressure difference between the pressure outside the refractive cavity 52 and the pressure inside the refractive cavity 52 decreases, and the refractive cavity 52 is more protruded.

In this way, the morphology of the refractive component 50 is adjusted by adjusting amount of the light-transmitting liquid 54.

The adjustment mechanism 60 is connected to the refractive component 50. The adjustment mechanism 60 is configured to adjust the morphology of the refractive component 50 to adjust a diopter of the refractive component 50. Specifically, the adjustment mechanism 60 includes a cavity 62, a slider 64, a drive component 66, an adjusting cavity 68, and a switch 61.

The slider 64 is slidably arranged in the cavity 62, the drive component 66 is connected to the slider 64, the adjusting cavity 68 is defined by both the cavity 62 and the slider 64, the adjusting cavity 68 is connected to the refractive cavity 52 through the side wall 59, and the drive component 66 is configured to drive the slider 64 to slide relative to the cavity 62 to adjust the volume of the adjusting cavity 68 and further adjust the amount of light-transmitting liquid 54 in the refractive cavity 52.

In this way, it is achieved that the volume of the adjusting cavity 68 is adjusted by the slider 64 to adjust the amount of light-transmitting liquid 54 in the refractive cavity 52. In an example, referring to FIG. 4, the slider 64 slides away from the side wall 59, the volume of the adjusting cavity 68 increases, the pressure in the adjusting cavity 68 decreases, the light-transmitting liquid 54 in the refractive cavity 52 enters the adjusting cavity 68, and the first film layer 56 is increasingly recessed inwards.

Figure 5:
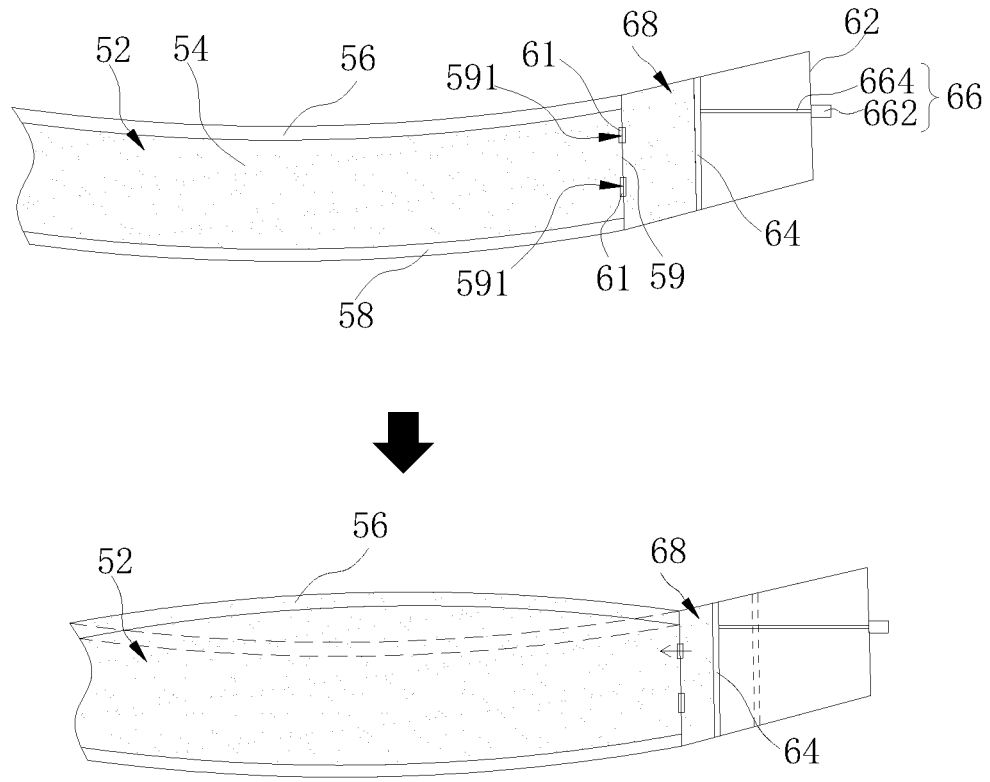
FIG. 5 is another diagram of an adjustment process of a wearable device in an embodiment of the disclosure.

In another example, referring to FIG. 5, the slider 64 slides towards the side wall 59, the volume of the adjusting cavity 68 decreases, the pressure in the adjusting cavity 68 increases, and the light-transmitting liquid 54 in the adjusting cavity 68 enters the refraction cavity 52, and the first film layer 56 is increasingly protruded outwards.

The side wall 59 is formed with a flow channel 591 that communicates the adjusting cavity 68 with the refractive cavity 52. The adjustment mechanism 60 includes a switch 61 arranged on the flow channel 591, and the switch 61 is configured to control an on/off state of the flow channel 591.

In the embodiment, the number of switches 61 is two, and the two switches 61 are one-way switches, one switch 61 being configured to control the light-transmitting liquid 54 to flow from the adjusting cavity 68 to the refractive cavity 52, and the other switch 61 being configured to control the light-transmitting liquid 54 to flow from the refractive cavity 52 to the adjusting cavity 68.

In this way, the flow of the light-transmitting liquid 54 between the adjusting cavity 68 and the refractive cavity 52 is achieved by the switches 61, so as to maintain the pressure balance on both sides of the side wall 59. As previously described, a change in the volume of the adjusting cavity 68 may lead to a change in the pressure in the adjusting cavity 68, so that the light-transmitting liquid 54 is caused to flow between the adjusting cavity 68 and the refractive cavity 52. The switches 61 control whether the flow of the light-transmitting liquid 54 between the adjusting cavity 68 and the refractive cavity 52 may be achieved by controlling the on/off state of the flow channel 591, so as to control the adjustment of the morphology of the refractive component 50.

Figure 4:
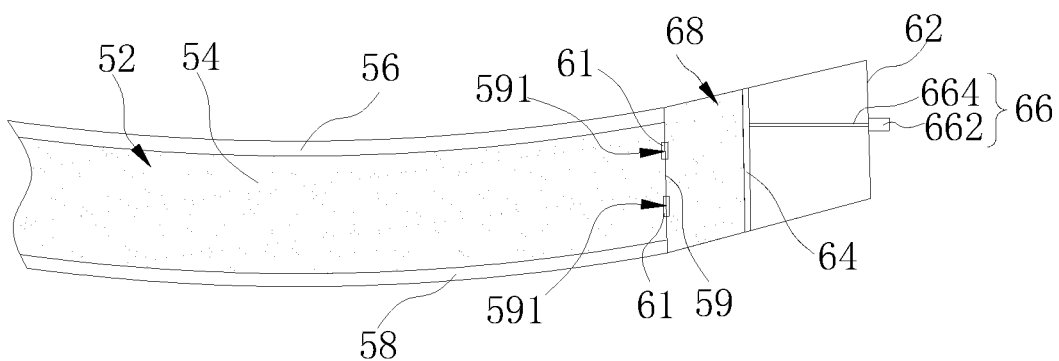
FIG. 4 is a diagram of an adjustment process of a wearable device in an embodiment of the disclosure.
Figure 4:
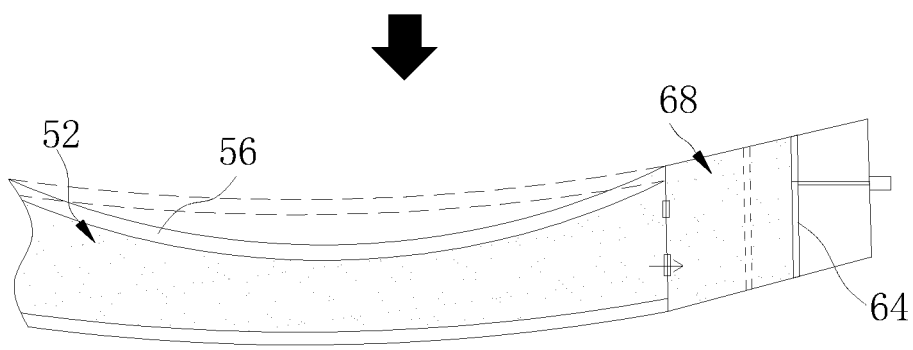

In an example, referring to FIG. 4, the switch 61 for controlling the light-transmitting liquid 54 to flow from the refractive cavity 52 to the adjusting cavity 68 is turned on, the slider 64 slides away from the side wall 59, the volume of the adjusting cavity 68 increases, the pressure in the adjusting cavity 68 decreases, the light-transmitting liquid 54 in the refractive cavity 52 enters the adjusting cavity 68 through the switch 61, and the first film layer 56 is increasingly recessed inwards.

In another example, the switch 61 for controlling the light-transmitting liquid 54 to flow from the refractive cavity 52 to the adjusting cavity 68 is turned off, even if the slider 64 slides away from the side wall 59, the volume of the adjusting cavity 68 increases, the pressure in the adjusting cavity 68 decreases, the light-transmitting liquid 54 in the refractive cavity 52 may not enter the adjusting cavity 68, and the morphology of the first film layer 56 does not change.

In another example, referring to FIG. 5, the switch 61 for controlling the light-transmitting liquid 54 to flow from the adjusting cavity 68 to the refractive cavity 52 is turned on, the slider 64 slides towards the side wall 59, the volume of the adjusting cavity 68 decreases, the pressure in the adjusting cavity 68 increases, and the light-transmitting liquid 54 in the adjusting cavity 68 enters the refraction cavity 52 through the switch 61, and the first film layer 56 is increasingly protruded outwards.

In another example, the switch 61 for controlling the light-transmitting liquid 54 to flow from the adjusting cavity 68 to the refractive cavity 52 is turned off, even if the slider 64 slides towards the side wall 59, the volume of the adjusting cavity 68 decreases, the pressure in the adjusting cavity 68 increases, and the light-transmitting liquid 54 in the adjusting cavity 68 may not enter the refraction cavity 52, and the morphology of the first film layer 56 does not change.

The drive component 66 may implement the function of driving the slider 64 to slide based on a variety of structures and principles.

In the examples of FIG. 1, FIG. 2, FIG. 3, FIG. 4 and FIG. 5, the drive component 66 includes a knob 662 and a lead screw 664 connected to the knob 662 and the slider 64. The knob 662 is configured to drive the lead screw 664 to rotate, so that the slider 64 is driven to slide relative to the cavity 62.

In this way, the slider 64 is driven by the knob 662 and the lead screw 664. Due to the matching of the lead screw 664 and the knob 662, the rotary motion of the knob 662 may be converted into a linear motion of the lead screw 664. When the user rotates the knob 662, the lead screw 664 may drive the slider 64 to slide relative to the cavity 62, which leads to the change of the volume of the adjusting cavity 68, adjusting the amount of light-transmitting liquid 54 in the refractive cavity 52. The knob 662 may be exposed from the housing 20 to facilitate rotation by the user.

Specifically, a threaded portion is formed on the knob 662, a threaded portion matching the knob 662 is formed on the lead screw 664, and the knob 662 is threaded with the lead screw 664.

While the knob 662 is rotated, the switch 61 may be turned on correspondingly. In this way, the light-transmitting liquid 54 may flow to ensure the pressure balance on both sides of the side wall 59.

In an example, the knob 662 rotates clockwise, and the slider 64 slides away from the side wall 59, in this case, the switch 61 for controlling the light-transmitting liquid 54 to flow from the refractive cavity 52 to the adjusting cavity 68 is turned on. In another example, the knob 662 rotates anticlockwise, and the slider 64 slides towards the side wall 59, in this case, the switch 61 for controlling the light-transmitting liquid 54 to flow from the refractive cavity 52 to the adjusting cavity 68 is turned on.

It should be noted that, in the embodiment, the rotation angle of the knob 662 is not correlated with the diopter of the refractive component 50, and the user may rotate the knob 662 to a position with the optimal visual experience. Of course, in other embodiments, the rotation angle of the knob 662 may be correlated with the diopter of the refractive component 50. In this case, it is not limited whether the rotation angle of the knob 662 is correlated with the diopter of the refractive component 50.

Figure 6:
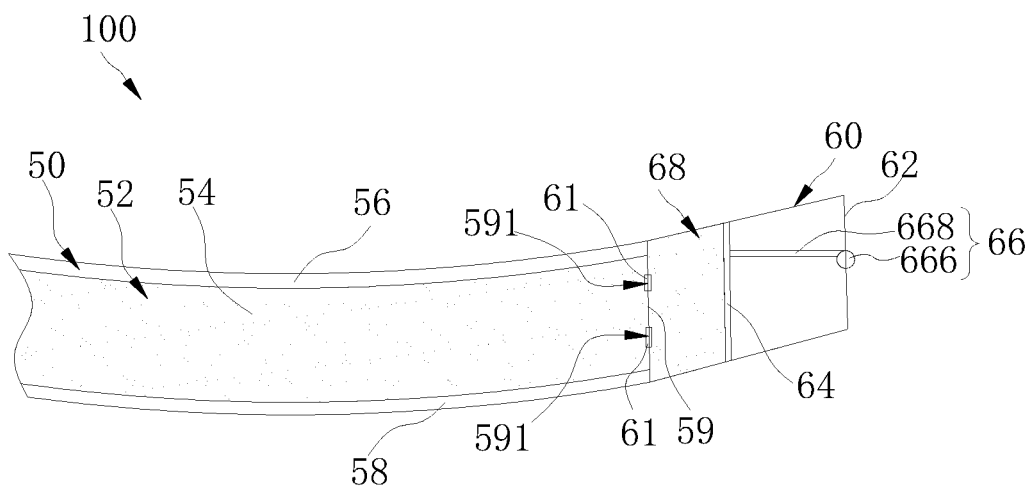
FIG. 6 is a plan view of a partial structure of a wearable device in another embodiment of the disclosure.

Referring to FIG. 6, the drive component 66 includes a gear 666 and a rack 668 engaged with the gear 666. The rack 668 is connected to the gear 666 and the slider 64, and the gear 666 is configured to drive the rack 668 to move, so that the slider 64 is driven to slide relative to the cavity 62.

In this way, it is achieved that the slider 64 is driven by the gear 666 and the rack 668. Due to the matching of the gear 666 and the rack 668, the rotary motion of the gear 666 may be converted into a linear motion of the rack 668. When the user rotates the gear 666, the rack 668 may drive the slider 64 to slide relative to the cavity 62, which leads to the change of the volume of the adjusting cavity 68, adjusting the amount of light-transmitting liquid 54 in the refractive cavity 52. The gear 666 may be exposed from the housing 20 to facilitate rotation by the user.

Similarly, while the gear 666 rotates, the switch 61 may be turned on correspondingly. In this way, the light-transmitting liquid 54 may flow to ensure the pressure balance on both sides of the side wall 59.

In an example, the gear 666 rotates clockwise so that the rack 668 is engaged on the gear 666, and the length of the rack 668 is shortened to pull the slider 64 to move away from the side wall 59, in this case, the switch 61 for controlling the light-transmitting liquid 54 to flow from the refractive cavity 52 to the adjusting cavity 68 is turned on.

In another example, the gear 666 rotates anticlockwise so that the rack 668 engaged on the gear 666 is detached from the gear 666, and the length of the rack 668 increases to drive the slider 64 to move towards the side wall 59, in this case, the switch 61 for controlling the light-transmitting liquid 54 to flow from the refractive cavity 52 to the adjusting cavity 68 is turned on.

Similarly, in the embodiment, the rotation angle of the gear 666 is not correlated with the diopter of the refractive component 50, and the user may rotate the gear 666 to a position with the optimal visual experience. Of course, in other embodiments, the rotation angle of the gear 666 may be correlated with the diopter of the refractive component 50. In this case, it is not limited whether the rotation angle of the gear 666 is correlated with the diopter of the refractive component 50.

Figure 7:
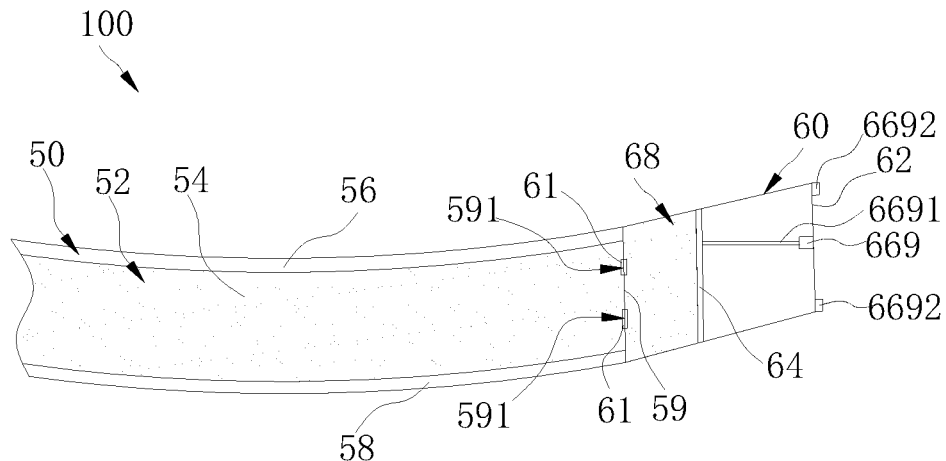
FIG. 7 is a plan view of a partial structure of a wearable device in another embodiment of the disclosure.

Referring to FIG. 7, the drive component 66 includes a drive motor 669 with a motor shaft 6691 connected to the slider 64, and the drive motor 669 is configured to drive the slider 64 to slide relative to the cavity 62.

In this case, it is achieved that the slider 64 is driven by the drive motor 669. Specifically, the drive motor 669 may be a linear motor. The linear motor, simple in structure, directly generates a linear motion without an intermediate switching mechanism, which may reduce motion inertia and improve dynamic response performance and positioning precision. The slider 64 is driven by the drive motor 669 such that the drive of the slider 64 is editable. For example, the drive motor 669 may be correlated with refractive diopter by calibrating in advance. The user may directly input the refractive diopter, and the drive motor 669 automatically operates to drive the slider 64 to slide to a corresponding position.

Further, the drive component 66 may further include an input unit 6692, the input unit 6692 including not limited to a key, a knob or a touch screen. In the example of FIG. 7, the input unit 6692 is a key, and two keys are respectively disposed on two opposite sides of the cavity 62. The key may be exposed from the housing 20 to facilitate pressing by the user. The key may control a working duration of the drive motor 669 according to a number or duration of external force pressing, so as to control the sliding distance of the slider 64.

Similarly, while the drive motor 669 works, the switch 61 may be turned on correspondingly. In this way, the light-transmitting liquid 54 may flow to ensure the pressure balance on both sides of the side wall 59.

In another example, the user presses one of the two keys and drives the motor shaft 6691 extended, and the motor shaft 6691 pushes the slider 64 to move towards the side wall 59, in this case, the switch 61 for controlling the light-transmitting liquid 54 to flow from the refractive cavity 52 to the adjusting cavity 68 is turned on.

In another example, the user presses the other of the two keys and drives the motor shaft 6691 shorten, and the motor shaft 6691 pulls the slider 64 to move away from the side wall 59, in this case, the switch 61 for controlling the light-transmitting liquid 54 to flow from the refractive cavity 52 to the adjusting cavity 68 is turned on.

It should be noted that, the refractive component 50 not only includes the above refractive cavity 52, the light-transmitting liquid 54, the first film layer 56, the second film layer 58, and the side wall 59, as long as the refractive component 50 may achieve the effect of changing a diopter. For example, in other implementations, the refractive component 50 includes a plurality of lenses and drive components. The drive component is configured to drive each lens to move from a receiving position to a refractive position. In this way, the diopter of the refractive component 50 may be changed by a combination of the plurality of lenses. Of course, the drive component may also drive each lens for moving to the refractive position to move on the refractive optical axis, which accordingly changes the diopter of the refractive component 50.

Therefore, the morphology of the above refractive component includes a shape and a state of the refractive component, and for the structure with the refractive cavity 52, the light-transmitting liquid 54, the first film layer 56, the second film layer 58, and the side wall 59, the shape of the first film layer 56 and/or the second film layer 58 is changed to achieve the change of the diopter; and for the structure with the plurality of lenses and the drive components, the state of the lenses is changed to achieve the change of the diopter.

In summary, the wearable device provided in the embodiment includes a display 40, a refractive component 50 and an adjustment mechanism 60. The refractive component 50 is disposed on a side of the display 40. The adjustment mechanism 60 is connected to the refractive component 50 for adjusting the morphology of the refractive component 50 so as to adjust the diopter of the refractive component 50.

For the wearable device in the embodiment of the disclosure, the morphology of the refractive component 50 is adjusted by the adjustment mechanism 60 to adjust the diopter of the refractive component 50 so that the user with refractive error may see an image displayed on the display 40 clearly, which is conductive to improving the user experience.

Moreover, in the wearable device 100 of the embodiment of the disclosure, the refractive component 50 and the adjustment mechanism 60 may correct the refractive diopter linearly, so that people with different refractive diopters may flexibly wear it. Meanwhile, due to the small volumes of both the refractive component 50 and the adjustment mechanism 60, the wearing experience of the wearable device 100 is not affected. The user does not need to purchase a plurality of lenses, which may reduce price.

In the related art, the user may interact with the wearable device by voice. However, in a complicated voice environment, such interaction easily causes false trigger of the wearable device. In addition, since a voice manipulator is recognized by a voiceprint technology in the related art, the manipulator needs to enter a voiceprint in advance. There may not be other people who have entered their voiceprints around the manipulator in use, and otherwise false trigger is easily caused and even unrecognized. As such, it is complex in operation, which is not beneficial to enhancing the user experience.

Figure 8:
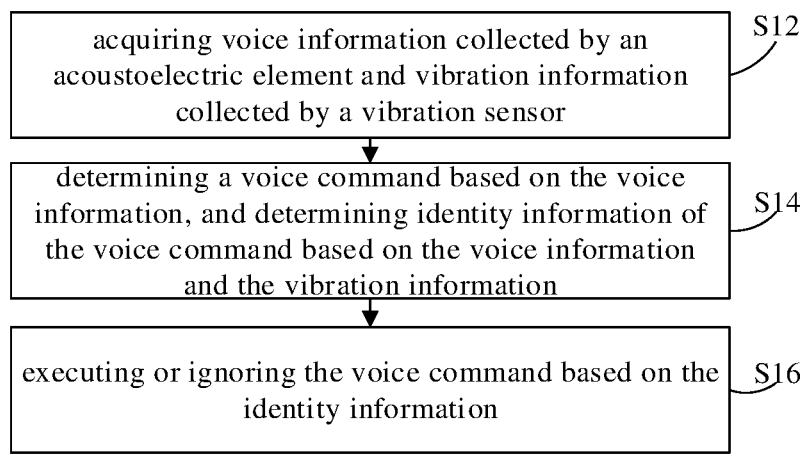
FIG. 8 is a flowchart of a wearable device in an embodiment of the disclosure.
Figure 9:
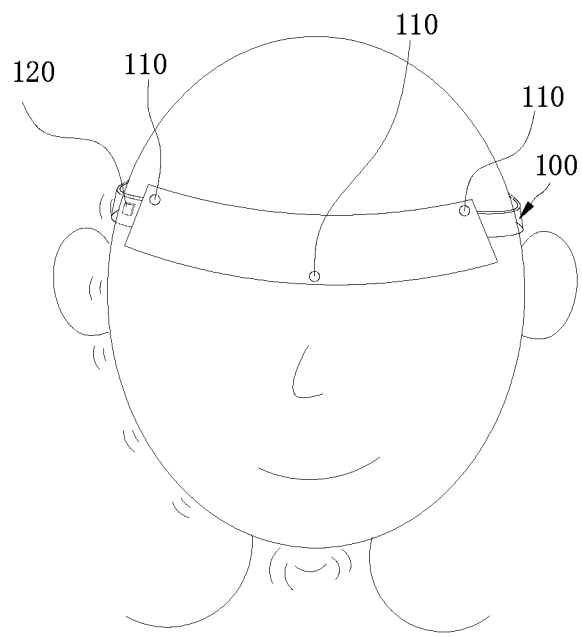
FIG. 9 is a scene diagram of a method for controlling a wearable device in an embodiment of the disclosure.

Referring to FIG. 8 and FIG. 9, the embodiment in the disclosure provides a method for controlling a wearable device 100. The wearable device 100 includes an acoustoelectric element 110 and a vibration sensor 120.

The control method includes: at S12, voice information collected by the acoustoelectric element 110 and vibration information collected by the vibration sensor 120 are acquired; at S14, a voice command is determined based on the voice information, and identity information of the voice command is determined based on the voice information and the vibration information; at S16, the wearable device 100 is controlled based on the identity information to execute the voice command or ignore the voice command.

Figure 10:
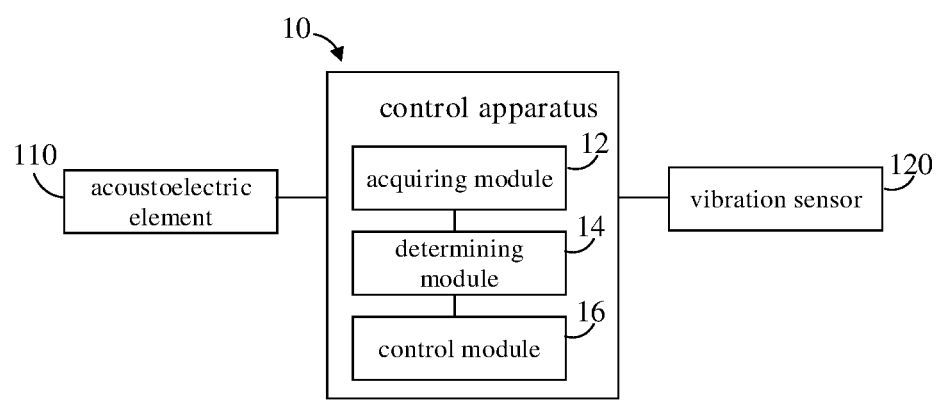
FIG. 10 is a module diagram of an apparatus for controlling a wearable device in an embodiment of the disclosure.

Referring to FIG. 10, the embodiment in the disclosure provides an apparatus 10 for controlling a wearable device 100. The wearable device 100 includes an acoustoelectric element 110 and a vibration sensor 120. The apparatus 10 includes an acquiring module 12, a determining module 14 and a control module 16. The acquiring module 12 is configured to acquire voice information collected by the acoustoelectric element 110 and vibration information collected by the vibration sensor 120. The determining module 14 is configured to determine a voice command based on the voice information, and determine identity information of the voice command based on the voice information and the vibration information. The control module 16 is configured to execute or ignore the voice command based on the identity information.

The embodiment in the disclosure provides a wearable device 100. The wearable device includes a housing 20, a processor 101, an acoustoelectric element 110 and a vibration sensor 120. The acoustoelectric element 110 is arranged in the housing, and the processor 101 is connected to the acoustoelectric element 110 and the vibration sensor 120. The processor 101 is configured to acquire voice information collected by the acoustoelectric element 110 and vibration information collected by the vibration sensor 120; determine a voice command based on the voice information, and determine identity information of the voice command based on the voice information and the vibration information; and execute or ignore the voice command based on the identity information.

With the method for controlling a wearable device 100, a control apparatus 10 and a wearable device 100 in the embodiment of the disclosure, identity information of the sender of the voice command is determined based on the voice information and the vibration information, so that the wearable device 100 is controlled to execute or ignore the voice command, which may avoid false trigger of the wearable device 100, and controlling the wearable device 100 is thus more accurate.

Specifically, the wearable device 100 may be electronic glasses, electronic clothes, an electronic bracelet, an electronic necklace, an electronic tattoo, a watch, an in-car headset, a pendant, a headset or other electronic device. The wearable device 100 may be a head mounted display (HMD) of an electronic device or a smart watch. The specific form of the wearable device 100 is not limited here.

It should be noted that, in an embodiment of the disclosure, a method for controlling a wearable device according to the embodiments of the disclosure is explained by taking the wearable device 100 being electronic glasses as an example, which does not represent a limitation to the specific form of the wearable device 100.

The number of the acoustoelectric elements 110 is three, the housing 20 includes a housing front wall 21. The three acoustoelectric elements 110 are arranged at a first preset position 211, a second preset position 212 and a third preset position 213 of the housing front wall 21 respectively.

The housing 20 includes a housing side wall 28 and a housing top wall 24, and the number of the housing side walls 28 is two. The two housing side walls 28 are arranged on opposite sides of the housing top wall 24 respectively. The first preset position 211 is close to the housing top wall 24 and one of the housing side walls 28, and the second preset position 212 is close to the housing top wall 24 and the other of the housing side walls 28.

The housing 20 includes a housing side wall 24 and a housing top wall 26. The housing side wall 24 and the housing top wall 26 are arranged on opposite sides of the housing front wall 21 respectively. A notch 262 is formed in the middle of the housing bottom wall 26 toward the housing top wall 24, and the third preset position 213 is close to the notch 262.

In this way, the three acoustoelectric elements 110 are distributed dispersedly, so that not only the wearable device 100 is beautiful in appearance, but also the de-reverberation effect may be improved when output information of the acoustoelectric elements 110 is de-reverberated to obtain the voice information.

In an example of FIG. 1, the acoustoelectric element 110 is a microphone. The number of the acoustoelectric elements 110 is three. The three acoustoelectric elements 110 are arranged at the first preset position 211, the second preset position 212 and the third preset position 213 respectively.

It may be understood that, in other examples, the number of acoustoelectric elements 110 is 1, 2, 4, 6 or other number value. The acoustoelectric elements 110 may be arranged on the first bracket 32, the second bracket 34 and at other position of the wearable device 100. The specific number and specific position of the acoustoelectric elements 110 are not limited here.

The wearable device 100 includes a supporting component 30 rotatably connected to the housing 20. The supporting component 30 includes a first bracket 32 and a second bracket 34, and the vibration sensor 120 is arranged on the first bracket 32 and/or the second bracket 34.

Further, an end of the first bracket 32 away from the housing 20 is formed with a first bending portion 322, an end of the second bracket 34 away from the housing 20 is formed with a second bending portion 342. The housing 20 includes a housing bottom wall 26. The first bending portion 322 and the second bending portion 342 are bent toward the housing bottom wall 26, and the vibration sensor 120 is arranged on the first bracket 32 and/or the second bracket 34.

In an example of FIG. 1, the vibration sensor 120 is a gyroscope. The number of the vibration sensor 120 is one, and the vibration sensor 120 is arranged on the first bending portion 322 of the first bracket 32 of the wearable device 100.

In another example, the number of the vibration sensors 120 is two, in which one of the vibration sensors 120 is arranged on the first bending portion 322 and the other of the vibration sensors 120 is arranged on the second bending portion 342.

Of course, in other examples, the number of the vibration sensor 120 is one, and the vibration sensor 120 may also be arranged on the second bending portion 342.

It may be understood that, when the user is speaking, a vibration of the vocal cord may cause a small synchronous vibration of the facial muscle. Therefore, the vibration sensor 120 is arranged on a portion where the supporting component 30 is in contact with the user's head, such as the first bending portion 322 and the second bending portion 342, so that the vibration sensor 120 may collect more and more accurate vibration information and controlling the wearable device 100 is thus more accurate based on the vibration information.

In other examples, the number of acoustoelectric elements 110 is 3, 4, 5 or other number value. The vibration sensor 120 may be configured on other position of the wearable device 100. The specific number and specific position of the acoustoelectric elements 110 are not limited here.

It should be noted that "voice command" herein may refer to information that may be recognized by the wearable device 100 and may be used to control the wearable device 100. "voice information" herein may refer to information that may extract a voice command. "voice information" may include a start moment of the voice information, an end moment of the voice information, voiceprint information, etc.

"vibration information" herein may include a start moment of the vibration information, an end moment of the vibration information, a frequency and an amplitude of the vibration, etc.

"identity information" herein may refer to an inherent identity of a maker (for example, a unique identity determined by the ID number), and may also refer to an identity taken by a maker due to a position, a behavior and a state (for example, an owner of the wearable device 100, a non-owner of the wearable device 100, a wearer of the wearable device 100, a non-wearer of the wearable device 100).

The specific form and specific content of the voice information, vibration information and identity information are not limited here.

In an example, the voice command is "change the boot password to 123456", it may be determined that the maker of the voice command is the owner of the wearable device 100 based on the voiceprint information of the voice information, and it may be determined that the voice command is sent by the wearer of the wearable device 100 based on the vibration information. That is, the identity information of the maker of the voice command may be determined as "owner" and "wearer" based on the voice information and vibration information. At this time, the wearable device 100 may be controlled to change the boot password to "123456". In this way, the boot passwords of other wearable devices that are not worn by a user having multiple wearable devices may be prevented from changing by mistake when it is necessary to change the boot password of the wearable device 100 that is being worn by the user.

In another example, the voice command is "change the boot password to 123456", it may be determined that the maker of the voice command is not the owner of the wearable device 100 based on the voiceprint information of the voice information, and it may be determined that the voice command is sent by the wearer of the wearable device 100 based on the vibration information. That is, it may be determined that the identity information of the maker of the voice command based on the voice information and vibration information are "non-owner" and "wearer". At this time, the wearable device 100 may be controlled to ignore the voice command. In this way, the boot password of the wearable device 100 that is worn by the non-owner user may be prevented from tampering by taking the chance.

Figure 11:
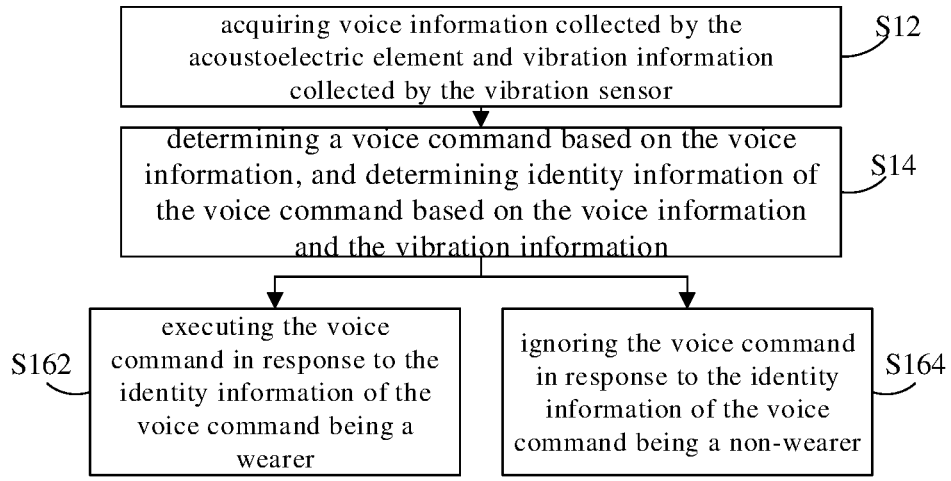
FIG. 11 is a flowchart of a method for controlling a wearable device in another embodiment of the disclosure.

Referring to FIG. 11, in some embodiments, the identity information includes a wearer and a non-wearer. The step S16 includes: at S162, the wearable device 100 is controlled to execute the voice command in response to the identity information of the voice command being a wearer; at S164, the wearable device 100 is controlled to ignore the voice command in response to the identity information of the voice command being a non-wearer.

Correspondingly, the control module 16 is configured to control the wearable device 100 to execute the voice command in response to the identity information of the voice command being a wearer; and control the wearable device 100 to ignore the voice command in response to the identity information of the voice command being a non-wearer.

Correspondingly, the processor 101 is configured to execute the voice command in response to the identity information of the voice command being a wearer; and ignore the voice command in response to the identity information of the voice command being a non-wearer.

In this way, it is achieved that the wearable device 100 may be controlled to execute the voice command or ignore the voice command based on the identity information. It may be understood that, when the wearable device 100 is in a noisy environment, false trigger of the wearable device 100 is easily caused by other voices in the environment when it is not distinguished whether the maker of the voice command is a wearer or a non-wearer. In the embodiment, in response to determining that the maker of the voice command is the wearer, the wearable device 100 is controlled to execute the voice command, which improves the adaptability of the wearable device 100 to the environment, and the wearable device 100 may also work normally in a voice chaotic environment.

In an example, three users wear 3 wearable devices 100 respectively, and control their respective wearable devices 100 respectively by voices. No. 1 user wears the No. 1 wearable device 100 and makes a voice command "open the document A"; No. 2 user wears the No. 2 wearable device 100 and makes a voice command "open the document B"; No. 3 user wears the No. 3 wearable device 100 and makes a voice command "open the document C".

For the No. 1 wearable device 100, it may be determined by the voice information and vibration information that, the maker of the voice command "open the document A" is a wearer (the No. 1 user) and the maker of the voice commands "open the document B" and "open the document C" is a non-wearer. At this time, the No. 1 wearable device 100 executes the voice command "open the document A" and ignores the voice commands "open the document B" and "open the document C".

For the No. 2 wearable device 100, it may be determined by the voice information and vibration information that, the maker of the voice command "open the document B" may be determined is a wearer (the No. 2 user) and the maker of the voice commands "open the document A" and "open the document C" is a non-wearer. At this time, the No. 2 wearable device 100 executes the voice command "open the document B" and ignore the voice commands "open the document A" and "open the document C".

For the No. 3 wearable device 100, it may be determined by the voice information and vibration information that, the maker of the voice command "open the document C" is a wearer, (the No. 3 user), and the maker of the voice commands "open the document B" and "open the document A" is a non-wearer. At this time, the No. 3 wearable device 100 executes the voice command "open the document C" and ignores the voice commands "open the document B" and "open the document A".

In this way, even if the environment is filled with voice commands "open the document A", "open the document B" and "open the document C", the wearable device 100 may exactly execute a voice command of the corresponding wearer.

Figure 12:
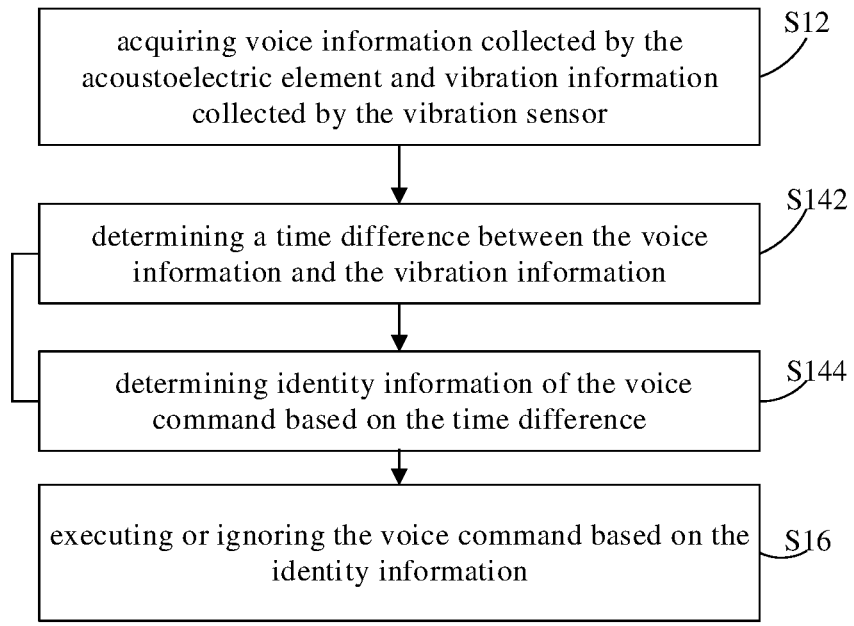
FIG. 12 is a flowchart of a method for controlling a wearable device in yet another embodiment of the disclosure.
Figure 13:
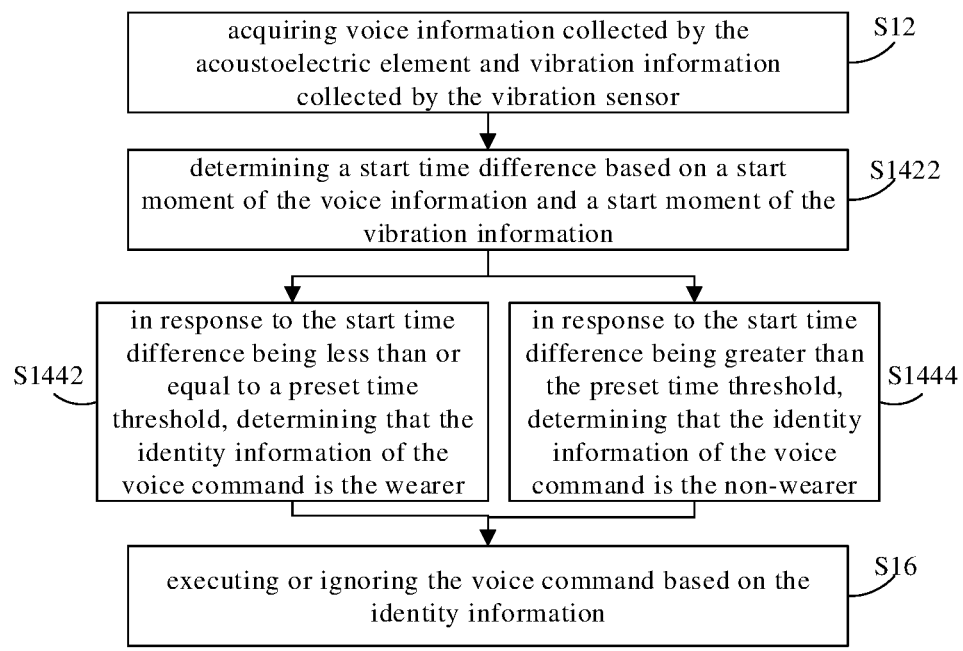
FIG. 13 is a flowchart of a method for controlling a wearable device in yet another embodiment of the disclosure.

Referring to FIG. 12, in some embodiments, the step S14 includes: at S142, a time difference between the voice information and the vibration information is determined; and at S144, the identity information is determined based on the time difference.

Correspondingly, the determining module 14 is configured to determine a time difference between the voice information and the vibration information; and determine the identity information based on the time difference.

Correspondingly, the processor 101 is configured to determine a time difference between the voice information and the vibration information; and determine the identity information based on the time difference.

In this way, it is achieved that the identity information of the maker of the voice command is determined based on the voice information and the vibration information. It may be understood that, the moment when the voice is generated is the same as the moment when the vocal cord starts to vibrate, and both the voice propagation and the vibration propagation require time. Therefore, the identity information of the maker of the voice command may be determined based on the time difference between the voice information and the vibration information.

Figure 14:
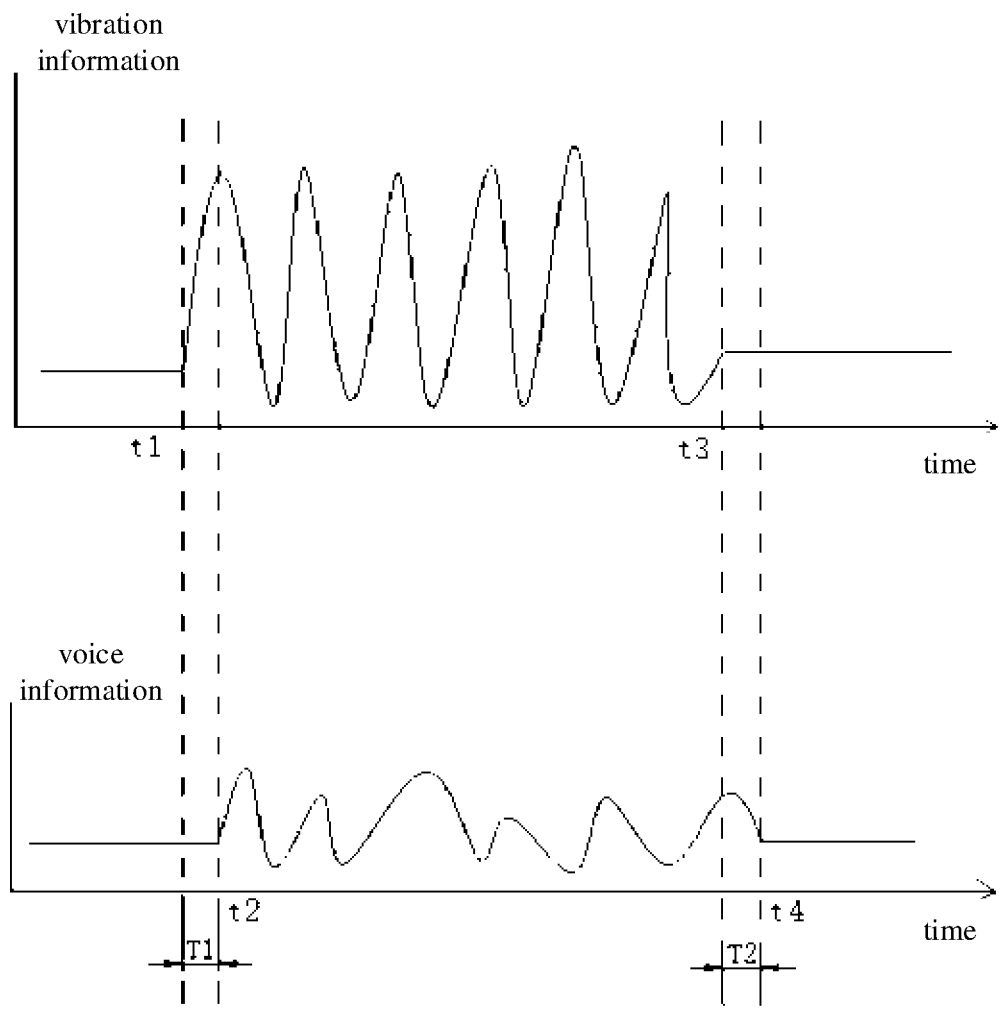
FIG. 14 is a diagram of vibration information and voice information in a method for controlling a wearable device in an embodiment of the disclosure.
Figure 15:
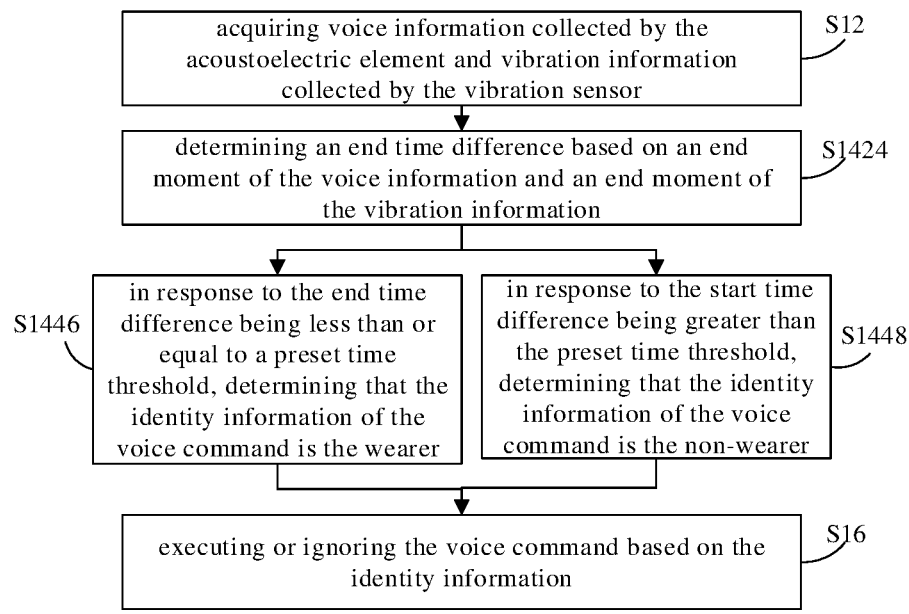
FIG. 15 is a flowchart of a method for controlling a wearable device in another embodiment of the disclosure.

Referring to FIG. 14 and FIG. 15, in some embodiments, the identity information includes a wearer and a non-wearer, and the time difference includes a start time difference T1. The step S142 includes: at S1422, the start time difference T1 is determined based on a start moment t2 of the voice information and a start moment t1 of the vibration information.

The step S144 includes: at S1442, in response to the start time difference T1 being less than or equal to a preset time threshold, it is determined that the identity information is the wearer; and at S1444, in response to the start time difference T1 being greater than the preset time threshold, it is determined that the identity information is the non-wearer.

Correspondingly, the determining module 14 is configured to determine the start time difference T1 based on a start moment t2 of the voice information and a start moment t1 of the vibration information; in response to the start time difference T1 being less than or equal to a preset time threshold, determine that the identity information is the wearer; and in response to the start time difference T1 being greater than the preset time threshold, determine that the identity information is the non-wearer.

Correspondingly, the processor 101 is configured to determine the start time difference T1 based on a start moment t2 of the voice information and a start moment t1 of the vibration information; in response to the start time difference T1 being less than or equal to a preset time threshold, determine that the identity information is the wearer; and in response to the start time difference T1 being greater than the preset time threshold, determine that the identity information is the non-wearer.

In this way, it is achieved that the identity information is determined based on the start time difference T1. Specifically, a time threshold may be obtained by experiments in advance and stored in a wearable device 100.

It may be understood that, the vibration information collected by the vibration sensor 120 originates from a small synchronous vibration of the facial muscle caused by the vibration of the vocal cord, therefore, the vibration information reflects information of the wearer of the wearable device 100, and the start moment t1 of the vibration information may be inferred as a moment when the wearer starts to make voices.

The voices may be propagated by air, and the voice information collected by the acoustoelectric element 110 may reflect both the wearer's information and the non-wearer's information. Therefore, in response to the start time difference T1 between the start moment t1 of the vibration information and the start moment t2 of the voice information being less than or equal to the preset time threshold, it may be inferred that the vibration starts simultaneously with the voice, and it may be thus judged that the voice command determined by voice information is made by the wearer. Therefore, in response to the start time difference T1 being greater than the preset time threshold, it may be inferred that the vibration does not start simultaneously with the voice that is made from a nearby voice source, which accordingly determines that the voice command determined by the voice information is made by the non-wearer.

In an example, the time threshold is 2 s. The start moment t1 of the vibration information is 0:00, the start moment t2 of the vibration information is 0:01, and the start time difference is 1 s less than the time threshold, it is determined that the identity information of the maker of the voice command is the wearer.

In another example, the time threshold is 2 s. The start moment t1 of the vibration information is 0:00, the start moment t2 of the vibration information is 0:03, and the start time difference is 3 s greater than the time threshold, it is determined that the voice is made from the nearby voice source, which accordingly determines that the identity information of the maker of the voice command is the non-wearer.

Referring to FIG. 15 and FIG. 14, in some embodiments, the identity information includes a wearer and a non-wearer, and the time difference includes an end time difference T2. The step S142 includes: at S1424, the end time difference T2 is determined based on an end moment t3 of the voice information and an end moment t4 of the vibration information.

The step S144 includes: at S1446, in response to the end time difference T2 being less than or equal to a preset time threshold, it is determined that the identity information is the wearer; and at S1448, in response to the start time difference T2 being greater than the preset time threshold, it is determined that the identity information is the non-wearer.

Correspondingly, the determining module 14 is configured to determine an end time difference T2 based on the end moment t3 of the voice information and an end moment t4 of the vibration information; in response to the end time difference T2 being less than or equal to a preset time threshold, determine that the identity information is the wearer; and in response to the end time difference T2 being greater than the preset time threshold, determine that the identity information is the non-wearer.

Correspondingly, the processor 101 is configured to determine an end time difference T2 based on an end moment t3 of the voice information and an end moment t4 of the vibration information; in response to the end time difference T2 being less than or equal to a preset time threshold, determine that the identity information is the wearer; and in response to the end time difference T2 being greater than the preset time threshold, determine that the identity information is the non-wearer.

In this way, it is achieved that the identity information is determined based on the end time difference T2. The principle and explanation of determining the identity information based on the end time difference T2 may refer to the part of determining the identity information based on the start time difference T1, which will not be repeated here to avoid redundancy.

In an example, the time threshold is 2 s. The end moment t4 of the vibration information is 0:00, the end moment t3 of the voice information is 0:01, and the end time difference T3 is 1 s less than the time threshold, it is determined that the identity information of the maker of the voice command is the wearer.

In another example, the time threshold is 2 s. The end moment t4 of the vibration information is 0:00, the end moment t3 of the voice information is 0:03, and the end time difference T3 is 3 s greater than the time threshold, it is determined that the identity information of the maker of the voice command is the non-wearer.

Figure 16:
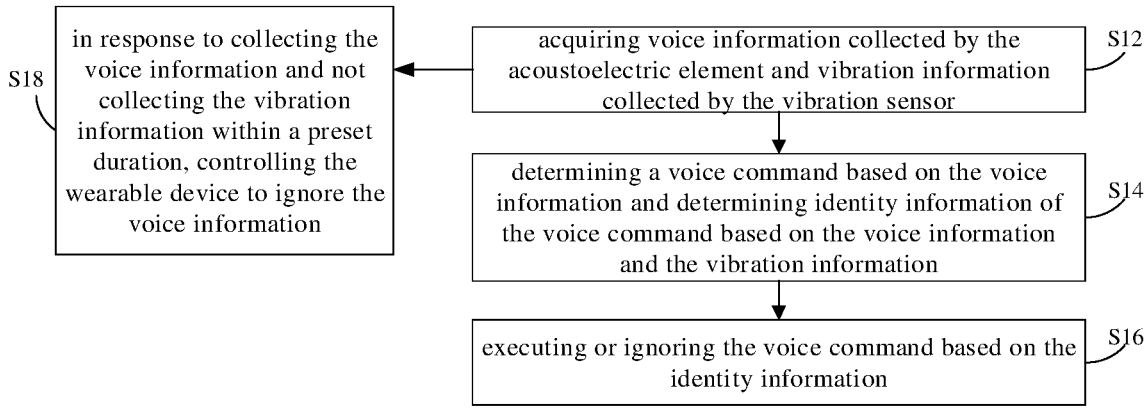
FIG. 16 is a flowchart of a method for controlling a wearable device in yet another embodiment of the disclosure.

Referring to FIG. 16, in some embodiments, the control method includes: S18: in response to collecting the voice information and not collecting the vibration information within a preset duration, the wearable device 100 is controlled to ignore the voice information.

Correspondingly, the control module 16 is configured to, in response to collecting the voice information and not collecting the vibration information within a preset duration, control the wearable device 100 to ignore the voice information.

Correspondingly, the processor 101 is configured to, in response to collecting the voice information and not collecting the vibration information within a preset duration, control the wearable device 100 to ignore the voice information.

In this way, it is achieved that in response to collecting the voice information and not collecting the vibration information within the preset duration, the wearable device 100 is controlled. It may be understood that, when the user wears electronic glasses, other sounds in the environment such as television sounds, broadcast sounds, the voices of the non-wearers, may also cause the acoustoelectric element 110 to collect voice information in addition to the user's own voices. However, it may be inferred that the user does not make voices without collecting the user's vibration information. Therefore, in response to collecting the voice information and not collecting the vibration information within the preset duration, the wearable device 100 may be controlled to ignore the voice information, to prevent from false trigger of the wearable device 100.

In an example, a preset duration is 10 s. The sounds made by the television enable the acoustoelectric element 110 to collect voice information, while the vibration information is not collected within the 10 s. At this time, it may be inferred that the wearer does not make a voice command, and the voice information may be thus ignored.

Figure 17:
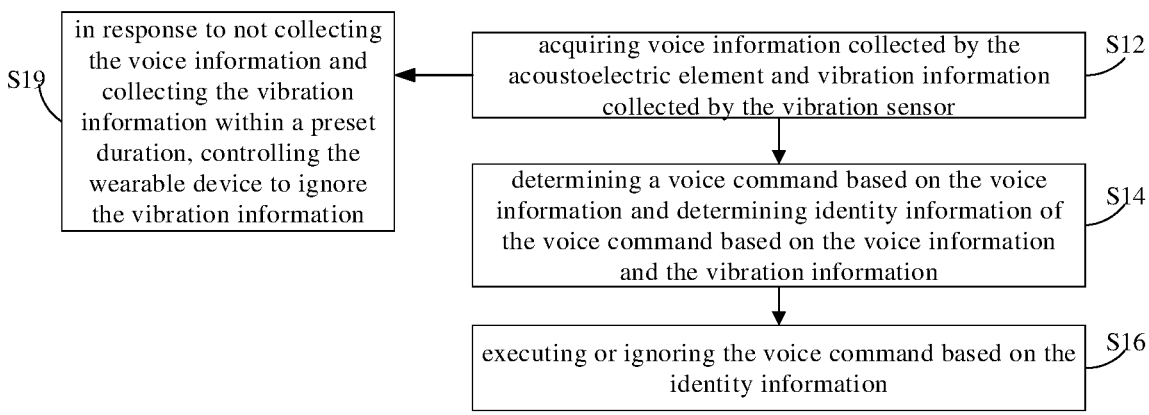
FIG. 17 is a flowchart of a method for controlling a wearable device in yet another embodiment of the disclosure.

Referring to FIG. 17, in some embodiments, the control method includes: at S19, in response to not collecting the voice information and collecting the vibration information within a preset duration, the wearable device 100 is controlled to ignore the vibration information.

Correspondingly, the control module 16 is configured to, in response to not collecting the voice information and collecting the vibration information within a preset duration, control the wearable device 100 to ignore the voice information.

Correspondingly, the processor 101 is configured to, in response to not collecting the voice information and collecting the vibration information within a preset duration, control the wearable device 100 to ignore the voice information.

In this way, it is achieved that in response to not collecting the voice information and collecting the vibration information within a preset duration, the wearable device 100 is controlled. It may be understood that when the user wears the electronic glasses, the vibration sensor 120 may collect vibration information by chewing, blood vessels pulsating, being hit in addition to the vibration of the vocal cord. In these cases, the acoustoelectric element 110 does not output information, or the voice information of the voice command may not be obtained even if the output information of the acoustoelectric element 110 is processed. Therefore, in response to not collecting the voice information and collecting the vibration information within the preset duration, the wearable device 100 may be controlled to ignore the vibration information.

In an example, a preset duration is 10 s. The vibration sensor 120 is caused by the user's blood vessel pulsating to collect vibration information, but the acoustoelectric element 110 does not output the output information or collect voice information within the 10 s. At this time, it may be inferred that the wearer does not make a voice command, and the voice information may be thus ignored.

In another example, a preset duration is 10 s. The vibration sensor 120 is caused by the user's chewing to collect vibration information, the acoustoelectric element 110 outputs the output information within the 10 s but may not obtain voice information that may extract the voice command based on the output information, that is, the voice information is not collected. At this time, it may be inferred that the wearer does not make a voice command, and the voice information may be thus ignored.

Figure 18:
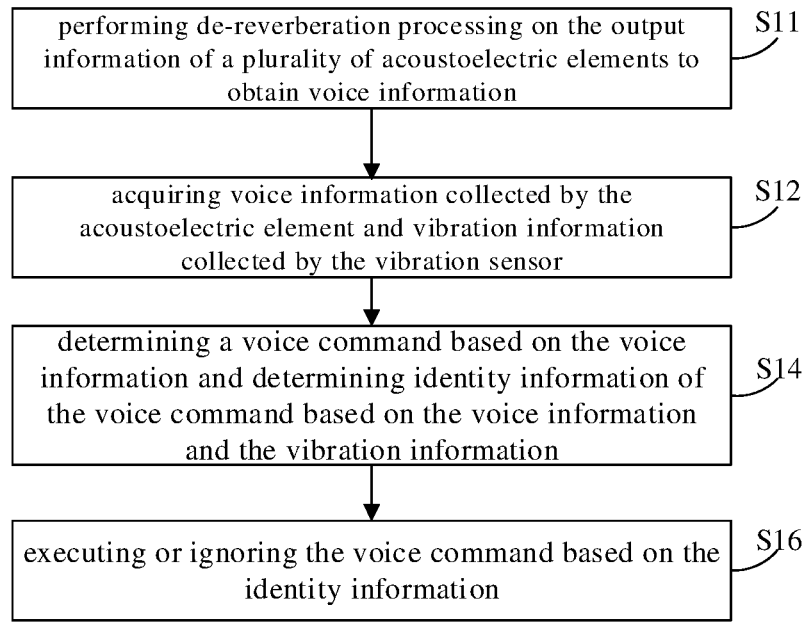
FIG. 18 is a flowchart of a method for controlling a wearable device in yet another embodiment of the disclosure.

Referring to FIG. 18, in some embodiments, the number of acoustoelectric elements 110 is more than one, and the control method includes: at S11, de-reverberation processing is performed on output information of a plurality of acoustoelectric elements 110 to obtain the voice information.

Correspondingly, the acquiring module 12 is configured to perform de-reverberation processing on output information of a plurality of acoustoelectric elements 110 to obtain the voice information.

Correspondingly, the processor 101 is configured to perform de-reverberation processing on output information of a plurality of acoustoelectric elements 110 to obtain the voice information.

In this way, it is achieved that, the voice information may be obtained from the output information of the acoustoelectric elements 110. Specifically, the plurality of acoustoelectric elements 110 form an array, the output information of which is de-reverberated by a special algorithm to obtain the voice information, such as, a blind signal enhancement based approach, a beamforming based approach, an inverse filtering based approach, etc. In this way, it is achieved that, the pure signal may be restored and the recognition effect of extracting the voice command from the voice information may be enhanced.

In addition, the plurality of acoustoelectric elements 110 form an array to achieve sound source localization. When the maker of the voice command is a non-wearer, the source and position of the voice command is further determined. Specifically, based on the information collected by the array of the acoustoelectric element 110, the angle and the distance of the sound source may be calculated, so as to achieve tracking of the sound source and subsequent voice directional pickup.

Figure 19:
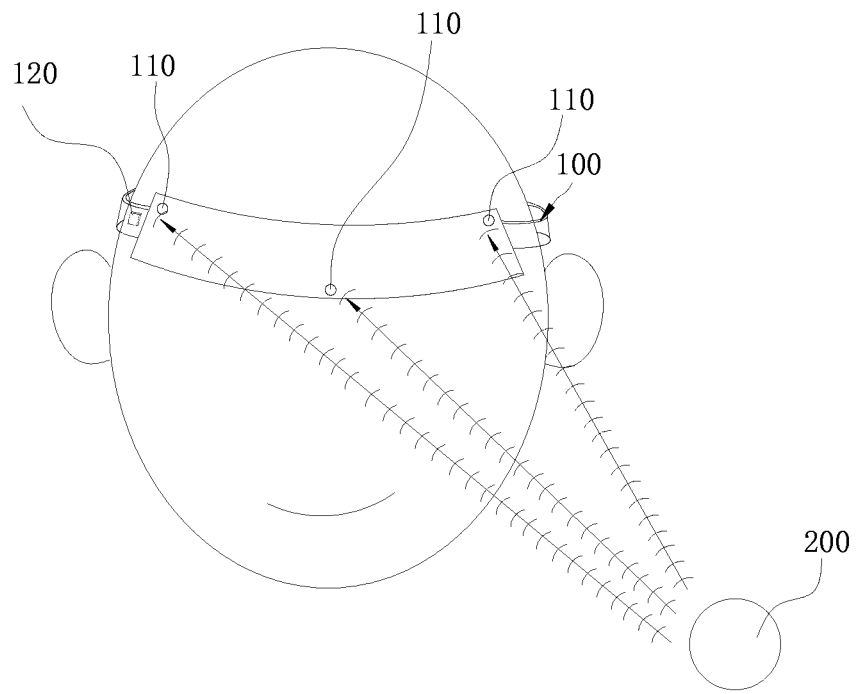
FIG. 19 is another scene diagram of a method for controlling a wearable device in an embodiment of the disclosure.

Referring to FIG. 19, the acoustoelectric element 110 is a microphone, and the number of the microphones is three, in which position coordinates of the three microphones are denoted as o1, o2, and o3 respectively. The maker is a sound source 200, and the wearable device 100 receives a voice command from the sound source 200.

Since the positions of three microphones are different, the time moments when sound waves emitted by the sound source 200 are transmitted to each microphone are different. Assuming that the time moments at which the sound waves emitted by the sound source 200 are transmitted to each of the microphones are t1, t2, and t3, respectively. The distances from the sound source 200 to each of the microphones are vt1, vt2 and vt3, respectively, in which v is a propagation speed of sounds in the air.

Then, a spherical surface may be drawn by taking each of the three microphones as an origin and each distance from the sound source 200 to each microphone as a radiuse respectively. That is, a first spherical surface is drawn by taking o1 as an origin and vt1 as a radius; a second spherical surface is drawn by taking o2 as an origin and vt2 as a radius; a third spherical surface is drawn by taking o3 as an origin and vt3 as a radius.

Then, an intersection of three spherical surfaces is calculated as a position of the sound source 200. It may be achieved by an algorithm.

Figure 20:
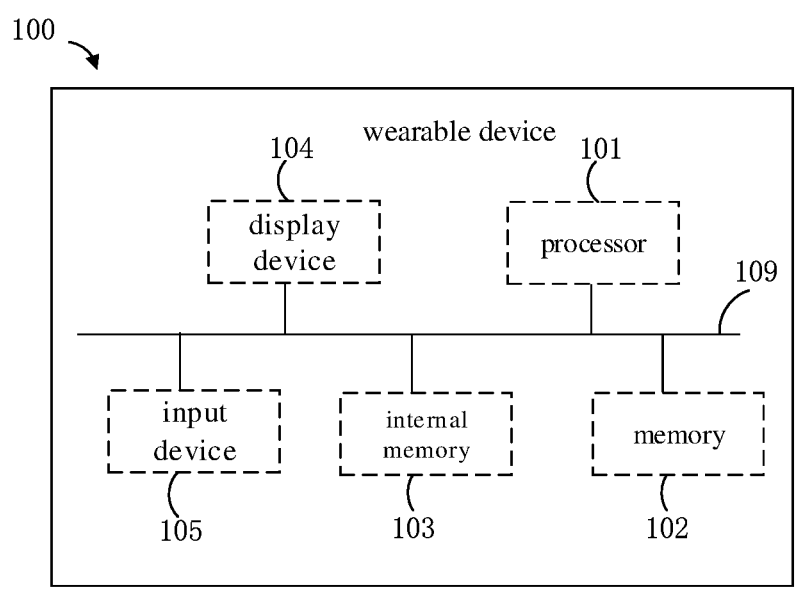
FIG. 20 is another module diagram of a wearable device in an embodiment of the disclosure.

Referring to FIG. 20, the embodiment in the disclosure provides a wearable device 100. The wearable device 100 includes a processor 101 and a memory 102. The memory 102 is stored with one or more programs, and the method for controlling a wearable device 100 in any of the above embodiments is implemented when the programs are executed by the processor 101.

For example, the followings are executed: at S12, voice information collected by the acoustoelectric element 110 and vibration information collected by the vibration sensor 120 are acquired; at S14, identity information of a maker of a voice command is determined based on the voice information and the vibration information, in which the voice command is determined by the voice information; and at S16, the wearable device 100 is controlled to execute the voice command or ignore the voice command based on the identity information.

The embodiment of the disclosure further provides a computer readable storage medium. A non-transitory computer readable storage medium has computer executable instructions. When the computer executable instructions are executed by one or more processors 101, the processor 101 is caused to execute the control method in the any of the above embodiments.

With the wearable device 100 and the computer readable storage medium in the embodiment of the disclosure, identity information of the maker of a voice command is determined based on the voice information and the vibration information, so that the wearable device 100 is controlled to execute or ignore the voice command, which may avoid false trigger of the wearable device 100, and controlling the wearable device 100 is more accurate.

FIG. 20 is a diagram of internal modules of a wearable device 100 in an embodiment. The wearable device 100 includes a processor 101, a memory 102 (for example, a non-transitory storage medium), an internal memory 103, a display device 104, and an input device 105 connected via a system bus 109.

The processor 101 may be configured to provide computing and control capabilities to support the running of the entire wearable device 100. The internal memory 103 of the wearable device 100 provides an environment for the running of computer readable instructions in the memory 102. The display device 104 of the wearable device 100 may be a display 40 arranged on the wearable device 100. The input device 105 may be an acoustoelectric element 110 and a vibration sensor 120 that are arranged on the wearable device 100, and may also be a key, a trackball or a touchpad arranged on the wearable device 100, or may also be an external keyboard, a touchpad, a mouse, etc. The wearable device 100 may be a smart bracelet, a smart watch, a smart helmet, electronic glasses, etc.

Those skilled in the art may understand that the structure shown in the figures is merely a diagram of a part of the structure related to the solution of the disclosure, which does not constitute a limitation to the wearable device 100 where the solution of the disclosure is applied, and the specific wearable device 100 may include more or fewer components than those shown in the figures, or combine certain components, or have different arrangements of components.

Those skilled in the art may understand that all or part of processes in the above embodiments may be implemented by instructing relevant hardware by computer programs. The programs may be stored in a non-transitory computer readable storage medium, and may be executed to implement the above processes in the method embodiments. The storage medium may be a magnetic disk, an optical disk, a read-only memory (ROM), etc.

The above embodiments only express several embodiments of the disclosure, and the descriptions are specific and detailed, however, it may not be understood as a limitation to the scope of the disclosure. It should be noted that, for those skilled in the art, several variations and improvements may be made without departing from the conception of the disclosure, which belongs to the protection scope of the disclosure. Therefore, the protection scope of the disclosure shall be subject to the claims.

What is claimed is:

1. A method for controlling a wearable device, wherein, the wearable device comprises an acoustoelectric element and a vibration sensor, the method comprising:

acquiring voice information collected by the acoustoelectric element and vibration information collected by the vibration sensor;

determining a voice command based on the voice information;

determining identity information of the voice command based on the voice information and the vibration information, wherein the identity information of the voice command comprises a wearer and a non-wearer; and executing or ignoring the voice command based on the identity information;

wherein determining the identity information of the voice command comprises:

determining a time difference between the voice information and the vibration information;

determining that the identity information of the voice command is the wearer in response to the time difference being less than or equal to a preset time threshold; and determining that the identity information of the voice command is the non-wearer in response to the time difference being greater than the preset time threshold.

2. The method of claim 1, wherein, when the preset time threshold is a first preset time threshold and the time difference comprises a start time difference, determining the identity information of the voice command comprises:

determining the start time difference based on a start moment of the voice information and a start moment of the vibration information;

in response to the start time difference being less than or equal to the first preset time threshold, determining that the identity information of the voice command is the wearer; and in response to the start time difference being greater than the first preset time threshold, determining that the identity information of the voice command is the non-wearer.

3. The method of claim 1, wherein, when the preset time threshold is a second preset time threshold and the time difference comprises an end time difference, determining the identity information of the voice command comprises:

determining the end time difference based on an end moment of the voice information and an end moment of the vibration information;

in response to the end time difference being less than or equal to the second preset time threshold, determining that the identity information of the voice command is the wearer; and in response to the end time difference being greater than the second preset time threshold, determining that the identity information of the voice command is the non-wearer.

4. The method of claim 1, wherein, executing or ignoring the voice command comprises:

in response to the identity information of the voice command being the wearer, executing the voice command; and in response to the identity information of the voice command being the non-wearer, ignoring the voice command.

5. The method of claim 1, further comprising:

in response to only collecting the voice information within a preset duration or in response to only collecting the vibration information, ignoring the voice information.

6. The method of claim 1, wherein the wearable device comprises an array of acoustoelectric elements, and the method further comprises:

locating a sound source of the voice command by taking an intersection of spherical surfaces for the acoustoelectric elements, wherein each of the spherical surfaces is drawn with a position of each acoustoelectric element as an origin and with a distance from the sound source to each acoustoelectric element as a radius.

7. The method of claim 1, wherein, the wearable device comprises a plurality of acoustoelectric elements, and the method comprises:

performing de-reverberation processing on output information of the plurality of acoustoelectric elements to obtain the voice information.

8. A wearable device, comprising:

a housing;

an acoustoelectric element arranged in the housing and configured to collect voice information;

a vibration sensor configured to collect vibration information; and a processor connected to the acoustoelectric element and the vibration sensor, wherein the processor is configured to:

acquire the voice information and the vibration information;

determine a voice command based on the voice information;

determine identity information of the voice command based on the voice information and the vibration information, wherein the identity information of the voice command comprises a wearer and a non-wearer; and execute or ignore the voice command based on the identity information, wherein the processor is further configured to:

determine a time difference between the voice information and the vibration information; determine that the identity information of the voice command is the wearer in response to the time difference being less than or equal to a preset time threshold; and determine that the identity information of the voice command is the non-wearer in response to the time difference being greater than the preset time threshold.

9. The wearable device of claim 8, wherein, the wearable device further comprises a supporting component connected to the housing, the supporting component comprises a first bracket and a second bracket, and the vibration sensor is arranged on the first bracket and/or the second bracket.

10. The wearable device of claim 9, wherein, an end of the first bracket away from the housing is formed with a first bending portion, and an end of the second bracket away from the housing is formed with a second bending portion, the housing comprises a housing bottom wall, the first bending portion and the second bending portion are bent toward the housing bottom wall, and the vibration sensor is arranged on the first bending portion and/or the second bending portion.

11. The wearable device of claim 10, wherein, the wearable device comprises two vibration sensors, in which one of the two vibration sensors is arranged on the first bending portion, and the other of the two vibration sensors is arranged on the second bending portion.

12. The wearable device of claim 8, wherein, the wearable device comprises three acoustoelectric elements, the housing comprises a housing front wall, and the three acoustoelectric elements are arranged at a first preset position, a second preset position and a third preset position of the housing front wall respectively.

13. The wearable device of claim 12, wherein, the housing comprises two housing side walls and a housing top wall, in which the two housing side walls are arranged on opposite sides of the housing top wall respectively, the first preset position is close to the housing top wall and one of the two housing side walls, and the second preset position is close to the housing top wall and the other of the two housing side walls.

14. The wearable device of claim 12, wherein, the housing comprises a housing top wall and a housing bottom wall, the housing top wall and the housing bottom wall are arranged on opposite sides of the housing front wall respectively, a notch is formed in a middle of the housing bottom wall toward the housing top wall, and the third preset position is close to the notch.

15. The wearable device of claim 8, wherein, the processor is further configured to determine a time difference between the voice information and the vibration information; and determine the identity information of the voice command based on the time difference.

16. The wearable device of claim 15, wherein when the preset time threshold is a first preset time threshold and the time difference comprises a start time difference, the processor is further configured to:
  determine the start time difference based on a start moment of the voice information and a start moment of the vibration information;
  in response to the start time difference being less than or equal to the first preset time threshold, determine that the identity information of the voice command is the wearer; and
  in response to the start time difference being greater than the first preset time threshold, determine that the identity information of the voice command is the non-wearer.

17. The wearable device of claim 15, wherein when the preset time threshold is a second preset time threshold and the time difference comprises an end time difference, the processor is further configured to:
  determine the end time difference based on an end moment of the voice information and an end moment of the vibration information;
  in response to the end time difference being less than or equal to the second a preset time threshold, determine that the identity information of the voice command is the wearer; and
  in response to the end time difference being greater than the second preset time threshold, determine that the identity information of the voice command is the non-wearer.

18. The wearable device of claim 8, wherein the processor is further configured to:
  in response to the identity information of the voice command being the wearer, execute the voice command; and
  in response to the identity information of the voice command being the non-wearer, ignore the voice command.

19. A non-transitory computer readable storage medium having computer executable instructions, wherein, when the computer executable instructions are executed by one or more processors, the processor is caused to execute a method for controlling a wearable device comprising an acoustoelectric element and a vibration sensor, the method comprising:
  acquiring voice information collected by the acoustoelectric element and vibration information collected by the vibration sensor;
  determining a voice command based on the voice information;
  determining identity information of the voice command based on the voice information and the vibration information, wherein the identity information of the voice command comprises a wearer and a non-wearer; and
  executing or ignoring the voice command based on the identity information;
wherein determining the identity information of the voice command comprises:
  determining a time difference between the voice information and the vibration information;
  determining that the identity information of the voice command is the wearer in response to the time difference being less than or equal to a preset time threshold; and
  determining that the identity information of the voice command is the non-wearer in response to the time difference being greater than the preset time threshold.

* * * * *